US010682946B2

(12) United States Patent
Kopecky et al.

(10) Patent No.: US 10,682,946 B2
(45) Date of Patent: Jun. 16, 2020

(54) ADJUSTING DEVICE FOR HEADLIGHTS

(71) Applicants: Hella KGaA Hueck & Co., Lippstadt (DE); HELLA AUTOTECHNIK NOVA s.r.o., Mohelnice (CZ)

(72) Inventors: Roman Kopecky, Lostice (CZ); Jan Formanek, Mohelnice (CZ); Jaroslaw Schimon, Bielefeld (DE); Domingo Guerrero, Soest (DE); Thomas Hilsenbeck, Erwitte (DE)

(73) Assignees: Hella KGaA Hueck & Co., Lippstadt (DE); HELLA AUTOTECHNIK NOVA s.r.o., Mohelnice (CZ)

( * ) Notice: Subject to any disclaimer, the term of this patent is extended or adjusted under 35 U.S.C. 154(b) by 0 days.

(21) Appl. No.: 15/556,044

(22) PCT Filed: Mar. 2, 2016

(86) PCT No.: PCT/DE2016/100094
§ 371 (c)(1),
(2) Date: Sep. 6, 2017

(87) PCT Pub. No.: WO2016/141926
PCT Pub. Date: Sep. 15, 2016

(65) Prior Publication Data
US 2018/0043817 A1    Feb. 15, 2018

(30) Foreign Application Priority Data
Mar. 12, 2015   (DE) .................. 10 2015 103 629

(51) Int. Cl.
*B60Q 1/10* (2006.01)
*B60Q 1/076* (2006.01)
*F21S 41/657* (2018.01)

(52) U.S. Cl.
CPC ............ *B60Q 1/076* (2013.01); *B60Q 1/10* (2013.01); *F21S 41/657* (2018.01)

(58) Field of Classification Search
CPC .................. B60Q 1/0683; B60Q 1/076
See application file for complete search history.

(56) References Cited

U.S. PATENT DOCUMENTS 4,574,334 A * 3/1986 Igura ................ B60Q 1/076
                                                 362/270
5,331,519 A * 7/1994 Fujino ................ B60Q 1/0683
                                                 362/289
(Continued)

FOREIGN PATENT DOCUMENTS

EP    1561969 A    8/2005
EP    2682304 A1   1/2014
(Continued)

OTHER PUBLICATIONS

International Search Report dated Jun. 28, 2016, in International Application No. PCT/DE2016/100094.

*Primary Examiner* — Alexander K Garlen
(74) *Attorney, Agent, or Firm* — Stephan A. Pendorf; Patent Central LLC

(57) ABSTRACT

An adjusting device for headlights, in particular for truck headlights, comprising a linear drive unit containing a threaded rod mounted for rotation, in threaded engagement with a control element, which control element can be moved in the axial direction of the threaded rod by turning the threaded rod, a pivot lever which has an articulated connection to the actuator, and an engagement element of the pivot lever which can act on the lighting unit to be adjusted, wherein the articulated connection is formed by a bearing part of the pivot lever and by a supporting part of the actuator such that the pivot lever can be turned about a horizontal pivot axis extending through the articulated con- (Continued)

Figure 1:
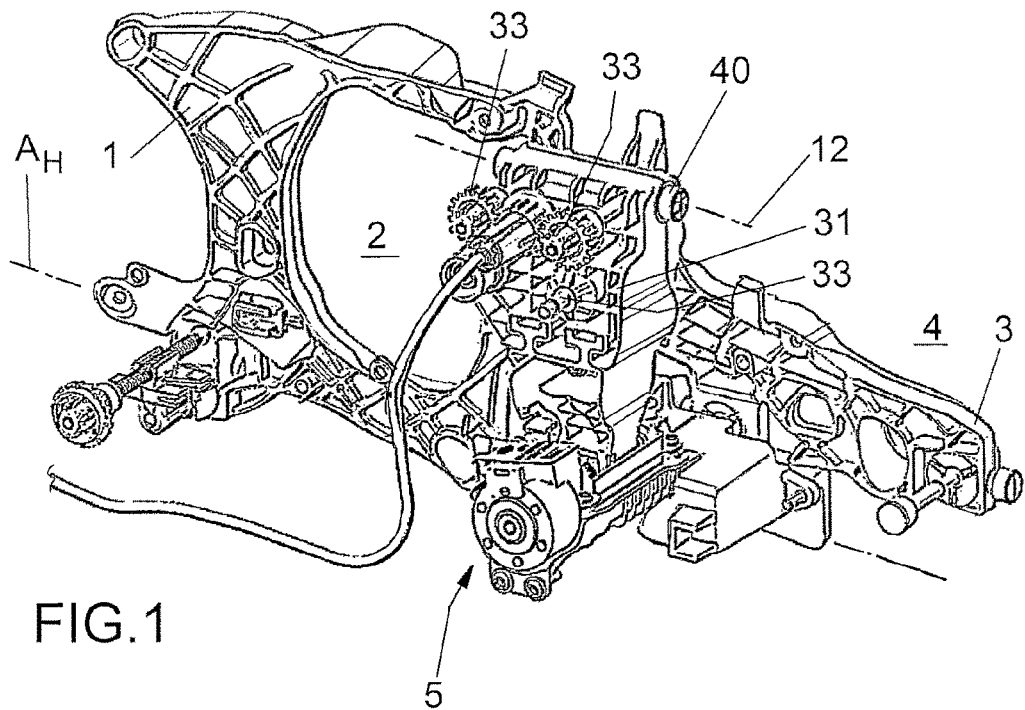

nection, such that the engagement element is arranged in an upper region of the pivot lever in the vertical direction, and such that the articulated connection is arranged in a lower region of the pivot lever in the vertical direction.

13 Claims, 3 Drawing Sheets

(56) References Cited

U.S. PATENT DOCUMENTS

| | | | | |
|---|---|---|---|---|
| 8,240,897 | B2* | 8/2012 | Narumi | B60Q 1/0683 362/282 |
| 2001/0036080 | A1* | 11/2001 | Shirai | B60Q 1/0683 362/460 |
| 2004/0093971 | A1* | 5/2004 | Fujibayashi | F16H 25/2006 74/89.42 |
| 2007/0082577 | A1* | 4/2007 | Tajima | B60Q 1/076 445/66 |
| 2008/0198614 | A1* | 8/2008 | Tajima | B60Q 1/076 362/508 |
| 2008/0225543 | A1* | 9/2008 | Kuwahara | B60Q 1/0683 362/523 |
| 2009/0323367 | A1* | 12/2009 | Lee | B60Q 1/076 362/469 |
| 2013/0319146 | A1* | 12/2013 | Lee | F16H 25/20 74/89.23 |

FOREIGN PATENT DOCUMENTS

| | | |
|---|---|---|
| EP | 2762358 A2 | 8/2014 |
| FR | 2972041 A1 | 8/2012 |
| KR | 20110000824 U | 1/2011 |
| KR | 20140016492 A | 2/2014 |

* cited by examiner

ADJUSTING DEVICE FOR HEADLIGHTS

The invention relates to an adjusting device for headlights, in particular for truck headlights, comprising a linear drive unit containing a threaded rod mounted for rotation, in threaded engagement with an actuator, which can be moved by turning the threaded rod in the axial direction, comprising a pivot lever which has an articulated connection to the actuator, comprising an engagement element of the pivot lever which can act on the lighting unit to be adjusted.

An adjusting device for headlights, which comprises a linear drive unit having a threaded rod, is known from EP 2 682 304 A1. Arranged on the threaded rod is an actuator which is in threaded connection with the same. The actuator is connected by means of an articulated connection to a pivot lever which acts with an engagement element on a lighting unit of a headlight such that the lighting unit can be turned about a vertical axis. The engagement element engages in a sliding track of the lighting unit. The lever arm present between the actuator and the engagement element is relatively small so that only relatively small actuating forces can be generated. If the lighting unit is to be turned about a horizontal axis, wherein the lighting unit is part of a truck headlight, relatively high actuating forces have to be provided. The adjusting device also has to have a stable construction so that no unwanted vibrations can occur.

The object of the present invention is therefore to further develop an adjusting device for headlights comprising a linear drive unit and a threaded rod such that relatively high actuating forces can be provided in a simple manner and such that the adjusting device meets dynamic requirements, in particular in terms of freedom from vibrations.

In order to achieve this object, the connection in conjunction with the preamble of Claim 1 is characterized in that the articulated connection is formed by a bearing part of the pivot lever and by a supporting part of the actuator such that the pivot lever can be turned about a horizontal pivot axis extending through the articulated connection, such that the engagement element is arranged in an upper region of the pivot lever in the vertical direction, and such that the articulated connection is arranged in a lower region of the pivot lever in the vertical direction.

According to the invention, an upright pivot lever is provided which is pivotably mounted in a lower region by means of a bearing part on an actuator of a linear drive unit. An engagement element acting on a lighting unit is arranged in an upper region of the pivot lever such that, due to a relatively long lever arm, high actuating forces for dynamically turning the lighting unit for the "lighting range control" function are guaranteed. The size of the lever arm of the pivot lever is selected to be sufficiently large that a minimum actuating force for turning the lighting unit is exceeded.

According to a preferred embodiment of the invention, the linear drive unit has an electrical drive for turning the threaded rod so that a dynamic adjustment of the lighting unit is guaranteed.

According to a further development of the invention, the linear drive unit is arranged in a trough-shaped housing. A free end of the threaded rod is rotatably mounted in a front region of this trough-shaped housing so that an actuator of the linear drive unit, which is connected to the threaded rod in the thread, can be axially or linearly moved in an actuation path range.

According to a further development of the invention, the trough-shaped housing is fixedly connected to the electrical drive and the electrical drive is detachably connected to the housing. In this way, the entire linear drive unit can be simply removed from a housing opening of the headlight by detaching the electrical drive.

According to a preferred embodiment of the invention, the bearing part of the pivot lever has two fork elements having a double groove. As a result of this, the bearing part can be simply mounted on the actuator of the linear drive unit, wherein the ability to turn the pivot lever about a horizontal pivot axis arranged at a distance from the actuator is guaranteed.

According to a further development of the invention, the actuator has an elevated pivot bar which extends transversely to the threaded rod, on which pivot bar a downwardly projecting pivot pin of the bearing part of the pivot lever is arranged in a guided manner. The pivot bar is preferably configured in a bulbous manner so that a guided pivot movement about the horizontal actuating pivot axis is provided.

According to a further development of the invention, the pivot lever has in an upper region a transverse bore in which a pivot lever cylinder having the pivot lever axis is mounted in order to turn the pivot lever. The transverse bore or the pivot lever axis is preferably arranged at the upper end of the pivot lever in order to provide a relatively large lever length.

According to a further development of the invention, the pivot lever has a plurality of reinforcing ribs which are arranged over a surface of the pivot lever in a distributed manner. The pivot lever therefore has a relatively space-saving and stable construction.

Figure 2:
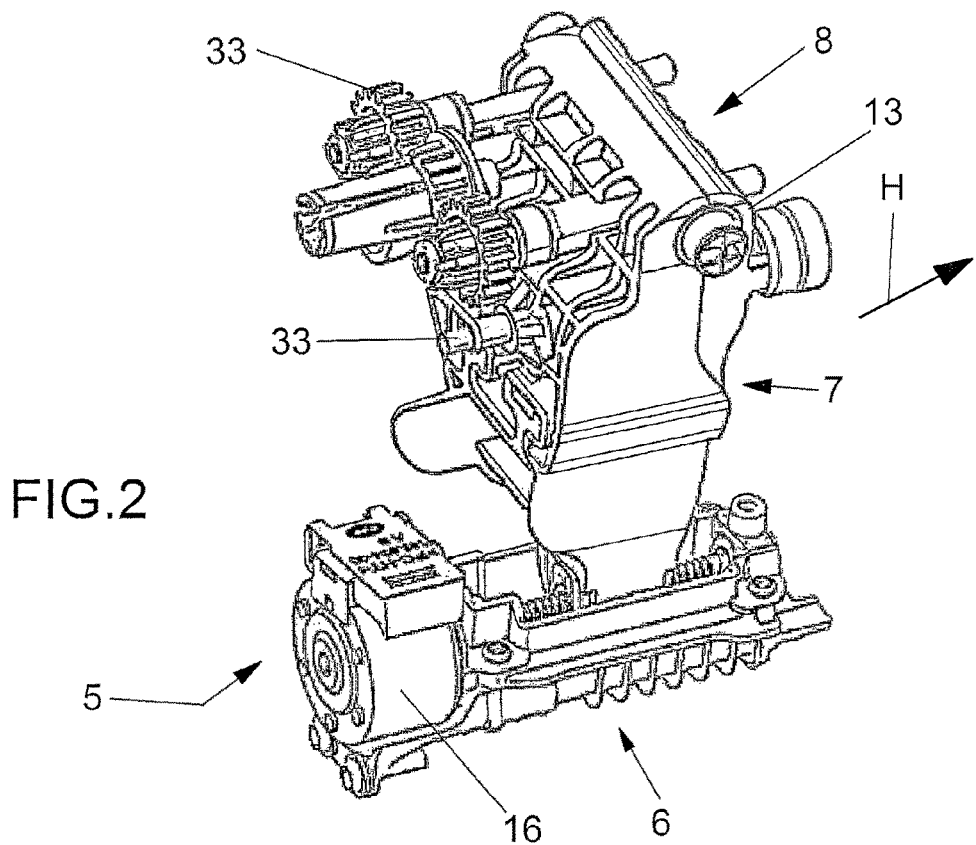
Figure 3:
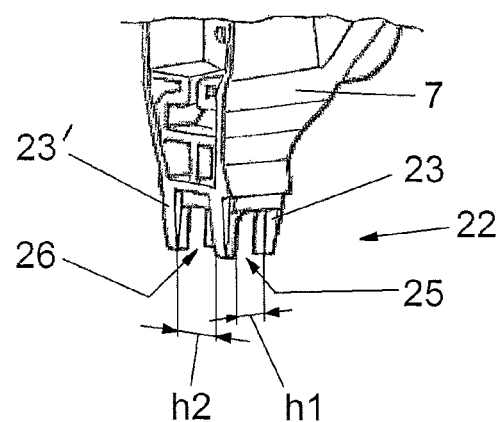
Figure 4:
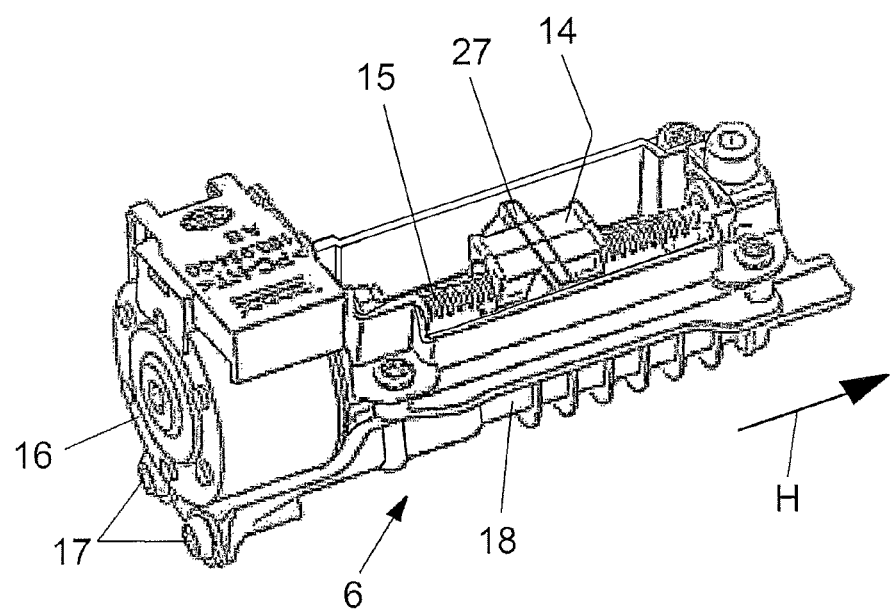
Figure 5:
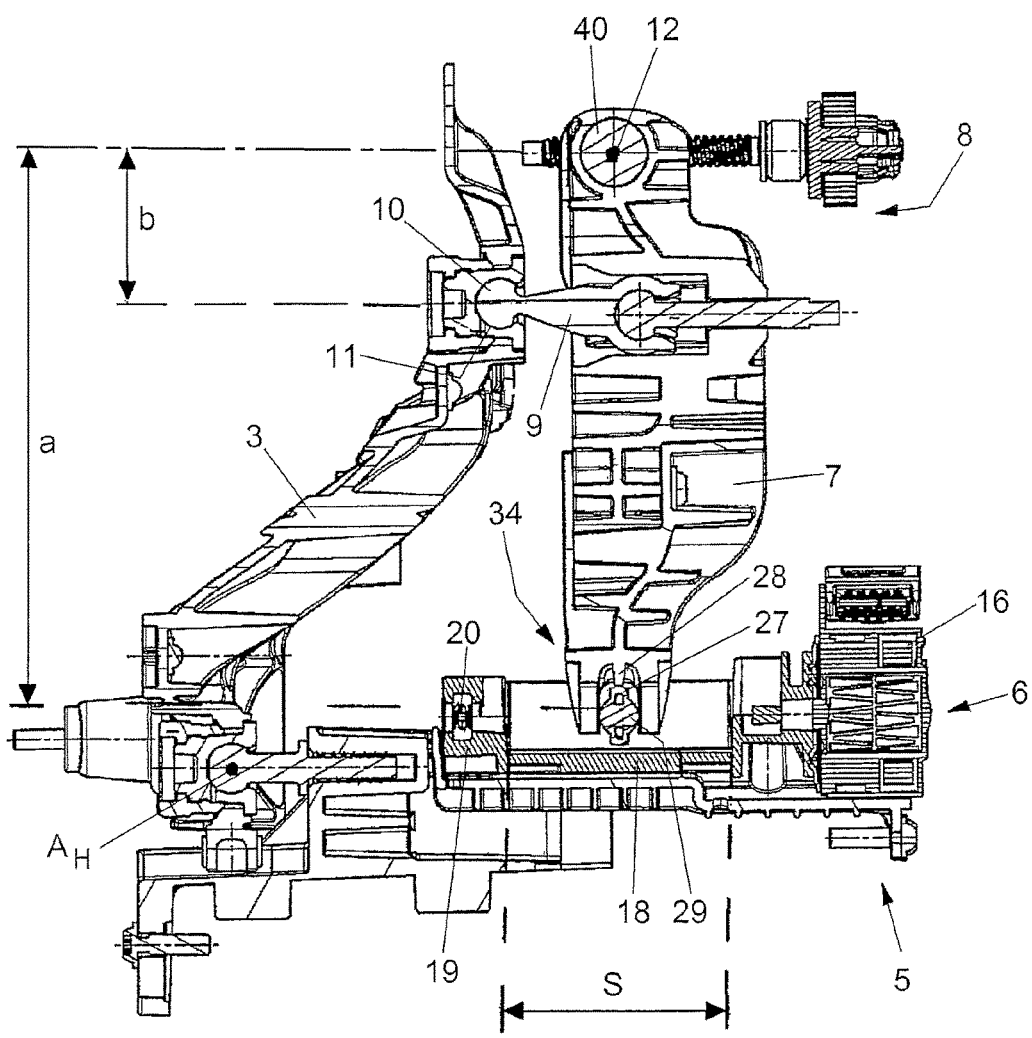

Further advantages of the invention are set out in the additional subordinate claims. One embodiment example of the invention will be explained in greater detail below with reference to the drawings, wherein:

FIG. 1 shows a perspective rear view of a headlight having two lighting units and appropriate supporting frames, wherein an adjusting device is arranged in a central area, FIG. 2 shows a perspective rear view of the adjusting device comprising a linear drive unit and comprising a pivot lever, FIG. 3 shows a perspective representation of a lower region of the pivot lever, FIG. 4 shows a perspective representation of the linear drive unit, and FIG. 5 shows a vertical section through the adjusting device.

A headlight for vehicles is preferably configured as a headlight for trucks. The headlight has a housing (not shown), to which a first supporting frame 1 for receiving a first lighting unit 2 and a second supporting frame 3 for receiving a second lighting unit 4 are fixed. The first lighting unit 2 and the second lighting unit 4 can each have a reflector and a light source, wherein the first lighting unit 2 can be used to generate a low-beam distribution and the second lighting unit 4 can be used to generate a high-beam distribution. The reflectors of the first lighting unit 2 and the second lighting unit 4 are each fixedly connected to the first supporting frame 1 and second supporting frame 3 respectively.

In order to adjust the lighting range of the second lighting unit 4 an adjusting device 5 is provided, by means of which the second lighting unit 4 is pivotably arranged about a horizontal axis $A_H$. The adjusting device 5 comprises a linear drive unit 6 as well as a pivoting lever 7 coupled to the linear drive unit.

The pivot lever 7 has in an upper region 8 of the same an engagement element 9 projecting in the main radiation direction H of the headlight, which engagement element has at its free end a sphere 10 which is mounted in a turning manner in a pan 11 of the supporting frame 3.

The horizontal axis $A_H$ extends coaxially to a pivot lever cylinder 40, which is rotatably mounted at the end side in the housing of the headlight. The pivot lever cylinder 40 is mounted, preferably rotatably mounted, in a transverse bore 13 of the pivot lever 7. The pivot lever cylinder 40 has a pivot lever axis 12 which extends parallel to the horizontal axis $A_H$.

The pivot lever 7 is mounted upright and is coupled in a lower region 34 of the same by means of an articulated connection to an actuator 14 of the linear drive unit 6.

The actuator 14 is in threaded engagement with a threaded rod 15 of the linear drive unit 6, wherein the threaded rod 15 is arranged oriented in the main radiation direction H. The threaded rod 15 is connected in a non-rotational manner to a drive shaft of an electrical drive 16 of the linear drive unit 6. The electrical drive 16 is configured as an electric motor which can be controlled by means of lines which are not shown. The electrical drive 16 is detachably connected by means of a screw connection 17 to the housing which is not shown. The electrical drive 16 is arranged in the main radiation direction H in a rear region of the linear drive unit 6. Joining the electrical drive 16 to the front in the main radiation direction H is a trough-shaped housing 18 which has a bearing 19 for mounting a free end 20 of the threaded rod 15 in a front region.

The actuator 14 of the linear drive unit 6 has a supporting part 21, on which is mounted the pivot lever 7 having a bearing part 22 at the end side. The bearing part 22 has two fork elements 23, 23' which form a double groove. The double groove has a first groove 25 and a second groove 26 extending perpendicularly to the same. The first groove 25 extends perpendicularly to the threaded rod 15. The second groove 26 extends in the direction of the threaded rod 15. The first groove 25 and the second groove 26 have such a groove width n1 and n2 respectively that the bearing part 22 can be mounted with play on the supporting part 21.

The supporting part 21 is configured in a cuboid form and has on an upper side of the same an elevated pivot bar 27 which extends transversely to the threaded rod 15. The pivot bar 27 is configured in a bulbous manner or in the form of an arc with a relatively large radius. The arc shape of the pivot bar 27 runs about an axis extending parallel to the pivot axis $A_H$. A pivot pin 28 of the bearing part 22 rests on the pivot bar 27. Since opposing lateral surfaces 29 of the supporting part 21, which are arranged offset with respect to one another in the axial direction of the threaded rod 15, also extend in a bulbous manner or in the form of an arc, a guided pivot movement of the pivot lever 7 can be effected on displacing the actuator 14 from a central position shown in FIG. 5 in the main radiation direction H forwards or backwards about the pivot axis $A_H$. An actuating path range S of the actuator 14 is designed such that a sufficiently large actuating path can be introduced by the engagement element 9 to the second supporting frame 3. The pivot lever 7 has a lever length a. The engagement element 9 is arranged at a lever arm distance b from the pivot axis 12. The size of the lever arm distance b is selected such that, on exploiting the actuating path range S, the required adjustment path for pivoting the second lighting unit 4 about the horizontal axis $A_H$ is guaranteed. In the present embodiment example, the ratio between the lever arm length b and lever arm a is 1:4. If necessary, the ratio between b and a can also be larger if the minimum actuating force can be smaller. The ratio of the lever arm length b and lever arm a should, however, be at least 0.3.

The pivot lever 7 is configured as a three-dimensional body which has a plurality of reinforcing ribs 31 distributed over its surface. These provide the pivot lever 7 with the required stability.

In the central position of the actuator 14, which is shown in FIG. 5, the pivot lever 7 extends in the vertical direction, wherein the actuator 14 and the pivot lever axis 12 span a vertical plane.

The pivot lever 7 can have additional bores for receiving additional actuating means 33, by means of which a basic mechanical adjustment or an adjustment of the lighting unit is facilitated during the installation of the headlight.

The pivot lever 7 is preferably produced from a plastic material.

The invention claimed is:

1. An adjusting device for headlights, comprising
a linear drive unit (6) extending in an axial direction, having a threaded rod (15) mounted for rotation, in threaded engagement with a control element (14), the control element (14) moveable in the axial direction by turning the threaded rod (15),
a pivot lever (7) having an upper articulated connection to a supporting frame (3) in an upper region (8) of the pivot lever and a lower articulated connection to the control element (14) in a lower region (34) of the pivot lever, and
an engagement element (9) provided on the pivot lever (7) between the upper articulated connection and lower articulated connection, which engagement element (9) is also connected to the lighting unit (4) to be adjusted,
wherein the lower articulated connection is formed by a bearing part (22) of the pivot lever (7) and by a supporting part (21) of the control element (14) such that the pivot lever (7) can be pivoted about a horizontal pivot axis (12) extending through the upper articulated connection,
wherein a lever having length (a) is formed by the pivot lever (7) from the upper articulated connection to the lower articulated connection,
wherein a lever arm having length (b) is formed by the pivot lever (7) from the upper articulated connection to the engagement element (9),
wherein (b)<(a).

2. The adjusting device according to claim 1, wherein the threaded rod (15) is coupled to an electrical drive (16) which is detachably connected to a housing of the headlight.

3. The adjusting device according to claim 2, wherein the linear drive unit (6) has a trough-shaped housing (18) in which at least one of the threaded rod (15) and the electrical drive (16) extend.

4. The adjusting device according to claim 3, wherein an end (20) of the threaded rod (15) which is opposite the electrical drive (16) is rotatably mounted in a front region of the trough-shaped housing (18).

5. The adjusting device according to claim 3, wherein the trough-shaped housing (18) is fixedly connected to the electrical drive.

6. The adjusting device according to claim 1, wherein the bearing part (22) is equipped with two fork elements (23, 23') which form a double groove (24), wherein a first groove (25) of the double groove extends transversely to the threaded rod (15) and a second groove (26) of the double groove, which extends perpendicularly to the first groove (25), extends in the direction of the threaded rod (15), and that at least one of the first groove (25) and the second groove (26) have such a groove width (n1, n2) that the bearing part (22) can be mounted with play on the supporting part (21).

7. The adjusting device according to claim 1, wherein the supporting part (21) has a pivot bar (27) which extends transversely to the threaded rod (15) and which is elevated with respect to an upper side of the same, on the pivot bar a projecting pivot pin (28) of the bearing part (22) is arranged in a guided manner.

8. The adjusting device according to claim 1, wherein the pivot lever (7) is held in the upper region (8) on a pivot lever cylinder (40) which extends transversely to the threaded rod (15) in a transverse bore (13) of the pivot lever (7) and which is mounted on the housing of the headlight.

9. The adjusting device according to claim 1, wherein the pivot lever (7) has a plurality of reinforcing ribs (31) which are arranged in a distributed manner over a surface of the pivot lever (7).

10. The adjusting device according to claim 1, wherein the pivot lever (7) is arranged in a central position of the control element (14) perpendicular to the threaded rod (15), wherein the pivot lever axis (12) and the control element (14) span a vertical plane.

11. The adjusting device according to claim 1, wherein the adjusting device is mounted in a truck.

12. An adjusting device for headlights, comprising
a linear drive unit (6) extending in an axial direction, having a threaded rod (15) mounted for rotation, in threaded engagement with a control element (14), the control element (14) moveable in the axial direction by turning the threaded rod (15),
a pivot lever (7) having an upper articulated connection to a supporting frame (3) in an upper region (8) of the pivot lever and a lower articulated connection to the control element (14) in a lower region (34) of the pivot lever, and
an engagement element (9) provided on the pivot lever (7) between the upper articulated connection and lower articulated connection, which engagement element (9) is also connected to the lighting unit (4) to be adjusted,
wherein the lower articulated connection is formed by a bearing part (22) of the pivot lever (7) and by a supporting part (21) of the control element (14) such that the pivot lever (7) can be pivoted about a horizontal pivot axis (12) extending through the upper articulated connection,
wherein a lever having length (a) is formed by the pivot lever (7) from the upper articulated connection to the lower articulated connection,
wherein a lever arm having length (b) is formed by the pivot lever (7) from the upper articulated connection to the engagement element (9),
wherein (b)/(a) is 0.25 or greater.

13. An adjusting device for headlights, comprising
a linear drive unit (6) extending in an axial direction, having a threaded rod (15) mounted for rotation, in threaded engagement with a control element (14), the control element (14) moveable in the axial direction by turning the threaded rod (15),
a pivot lever (7) having an upper articulated connection to a supporting frame (3) in an upper region (8) of the pivot lever and a lower articulated connection to the control element (14) in a lower region (34) of the pivot lever, and
an engagement element (9) provided on the pivot lever (7) between the upper articulated connection and lower articulated connection, which engagement element (9) is also connected to the lighting unit (4) to be adjusted,
wherein the lower articulated connection is formed by a bearing part (22) of the pivot lever (7) and by a supporting part (21) of the control element (14) such that the pivot lever (7) can be pivoted about a horizontal pivot axis (12) extending through the upper articulated connection,
wherein a lever having length (a) is formed by the pivot lever (7) from the upper articulated connection to the lower articulated connection,
wherein a lever arm having length (b) is formed by the pivot lever (7) from the upper articulated connection to the engagement element (9),
wherein $0.3 < (b)/(a)$.

* * * * *